US012032334B2

(12) United States Patent
Lederer et al.

(10) Patent No.: US 12,032,334 B2
(45) Date of Patent: Jul. 9, 2024

(54) ESCAPEMENT SYSTEM AND MEASURING DEVICE COMPRISING SAID ESCAPEMENT SYSTEM

(71) Applicant: Creaditive AG, Hergiswil (CH)

(72) Inventors: Karl Bernhard Lederer, Gals (CH); Georg Von Tardy-Tuch, Kapfenhardt (DE)

(73) Assignee: Creaditive AG, Hergiswil (CH)

( * ) Notice: Subject to any disclaimer, the term of this patent is extended or adjusted under 35 U.S.C. 154(b) by 527 days.

(21) Appl. No.: 17/250,430

(22) PCT Filed: May 13, 2019

(86) PCT No.: PCT/EP2019/062205
§ 371 (c)(1),
(2) Date: Jan. 20, 2021

(87) PCT Pub. No.: WO2020/015889
PCT Pub. Date: Jan. 23, 2020

(65) Prior Publication Data

US 2021/0286320 A1 Sep. 16, 2021

(30) Foreign Application Priority Data

Jul. 20, 2018 (DE) ..................... 10 2018 212 113.3

(51) Int. Cl.
*G04B 15/08* (2006.01)
*G04B 15/10* (2006.01)
(Continued)

(52) U.S. Cl.
CPC ............. *G04B 15/08* (2013.01); *G04B 15/10* (2013.01); *G04B 15/14* (2013.01); *G04B 17/26* (2013.01)

(58) Field of Classification Search
CPC ........ G04B 15/08; G04B 15/10; G04B 15/14; G04B 17/26
See application file for complete search history.

(56) References Cited

U.S. PATENT DOCUMENTS

| | | | |
|---|---|---|---|
| 1,867,947 A | 7/1932 | Ulrich | |
| 2,717,488 A | 9/1955 | Rene | |
| 2019/0076876 A1* | 3/2019 | Shibuya | B05D 5/083 |

FOREIGN PATENT DOCUMENTS

| | | | |
|---|---|---|---|
| CH | 708043 A2 * | 11/2014 | G04B 13/027 |
| EP | 3070537 A1 | 9/2016 | |

(Continued)

OTHER PUBLICATIONS

EP-3121661-A1 FiIT translation (Year: 2017).*

(Continued)

*Primary Examiner* — Edwin A. Leon
*Assistant Examiner* — Kevin Andrew Johnston
(74) *Attorney, Agent, or Firm* — Schwegman Lundberg & Woessner, P.A.

(57) ABSTRACT

The present invention relates to an escapement system that can be used, for example, in a measuring device such as in a timepiece. The escapement system comprises a drive axle and at least one escape wheel that has at least one impulse tooth. The at least one impulse tooth is connected to the drive axle via at least one spring element and has a starting position in which it is fixed such that the spring element has a preload torque.

13 Claims, 5 Drawing Sheets

(51) Int. Cl.
*G04B 15/14* (2006.01)
*G04B 17/26* (2006.01)

(56) References Cited

FOREIGN PATENT DOCUMENTS

| | | | | | |
|---|---|---|---|---|---|
| EP | 3121661 | A1 | * | 1/2017 | ............. G04B 15/08 |
| EP | 3121661 | A1 | | 1/2017 | |
| EP | 3293583 | A1 | * | 3/2018 | ............. G04B 15/06 |
| EP | 3293583 | A1 | | 3/2018 | |
| GB | 708043 | A | | 4/1954 | |

OTHER PUBLICATIONS

"International Application Serial No. PCT/EP2019/062205, International Preliminary Report on Patentability mailed Aug. 6, 2020", (Aug. 6, 2020), 4 pgs.
"International Application Serial No. PCT/EP2019/062205, International Search Report mailed Sep. 6, 2019", (Sep. 6, 2019), 2 pgs.
"International Application Serial No. PCT/EP2019/062205, Written Opinion mailed Sep 6, 2019", (Sep. 6, 2019), 6 pgs.

* cited by examiner

ESCAPEMENT SYSTEM AND MEASURING DEVICE COMPRISING SAID ESCAPEMENT SYSTEM

PRIORITY APPLICATIONS

This application is a U.S. National Stage Filing under 35 U.S.C. § 371 from International Application No. PCT/EP2019/062205, filed on May 13, 2019, and published as WO2020/015889 on Jan. 23, 2020, which claims the benefit of priority to German Application No. 10 2018 212 113.3, filed on Jul. 20, 2018; the benefit of priority of each of which is hereby claimed herein, and which applications and publication are hereby incorporated herein by reference in their entirety.

The present invention relates to an escapement system that can be used, for example, in a measuring device such as in a timepiece. The escapement system comprises a drive axle and at least one escape wheel that has at least one impulse tooth. The at least one impulse tooth is connected to the drive axle via at least one spring element and has a starting position in which it is fixed such that the spring element has a preload torque.

It is known that power regulators in driven gear wheels and timepieces are subject to various force fluctuations that are inter alia caused by the quality of the drive spring, of the driven gear wheel or the lubricant. These force fluctuations causatively influence the isochronism of the power regulator and thus the quality of a timepiece. It has therefore been endeavored to keep the drive train that moves during the impulse as short as possible to minimize the number of interference sources. To solve this problem, it is known from CH 708 043 to place the teeth of the escape wheel onto spring elements that are raised to an energy level by the force that is transmitted to the escape wheel by the power train. The energy thus stored is output in part during the impulse transmission to the lifting surfaces of the anchor. The energy transmitted by the rotation of the escape wheel that is known to be subject to strong fluctuations is always added to this energy, however, so that the device described in CH 708 043 admittedly attenuates the fluctuations a little, but cannot eliminate them as is also correctly presented in the text quoted there. An absolutely comparable device is shown in U.S. Pat. No. 2,717,488 in which, however, the noise minimization of an escapement is always the focus.

A different objective underlies the present invention, however. It was thus the object of the present invention to provide an escapement system having a constant impulse energy and a high efficiency.

This object is achieved with respect to an escapement system by the features of claim 1 and with respect to a measuring device by the features of claim 11. The respective dependent claims in this respect represent advantageous further developments.

In accordance with the invention, an escapement system is thus provided that comprises a drive axle and at least one escape wheel, wherein the at least one escape wheel has at least one impulse tooth. The at least one impulse tooth is connected to the drive axle via at least one spring element and has a starting position (or preferably adopts a starting position) in which it is fixed such that the spring element has a preload torque.

The impulse tooth or teeth of the escape wheel each has/have at least two positions they can adopt. One of these positions is the starting position in which the impulse tooth has a low energy level and in which the impulse tooth is located as long as it is not raised to its high energy level, is held there, or is in the phase of energy transmission. A further position is e.g. the tensioning position in which the impulse tooth has its high energy level and into which the impulse tooth is brought during the rotation of the escape wheel ($\Delta\alpha$) before it returns to the starting position again after its energy output. The starting position can here also be called the position in which the impulse tooth or the spring element has the smallest or lowest tension in a cycle of the escape wheel. The tensioning position can here also be called the position in which the impulse tooth or the spring element has the greatest tension in a cycle of the escape wheel. The tension of the impulse tooth or of the spring element is thus generally lower in the starting position than in the tensioning position.

The present invention is characterized in that the impulse tooth has a preload torque (>0 Nm) while it is in the starting position. In other words, the impulse tooth is already preloaded by a torque in its starting position.

The present disclosure here decisively differs from the devices described in US 25 2,717,488 and CH 708 043. Resilient impulse teeth are likewise proposed there. However, they are used to reduce the escape noises in U.S. Pat. No. 2,717,488. A preload of the resilient impulse teeth in the starting position is not disclosed in U.S. Pat. No. 2,717,388. CH 708 043 takes up a similar technical solution, but intends to present a constant force escapement, with the impulse teeth having no 30 preload in their starting position or in their resting position and with the escape wheel not have any separate resting teeth.

Since the at least one impulse tooth has a preload torque in its starting position in the present invention, the escapement system in accordance with the invention has an energy store that is integrated in the escape wheel and that can forward the impulse directly or indirectly to a balance (e.g. via an anchor). This energy store is integrated here into every single impulse tooth or in into every group of impulse teeth of the escape wheel.

In the escapement development, the inertia of the impulse generating elements represents a great challenge. It decisively determines the size of the escape wheels and the frequency of the balance At oscillations at 2.5 Hz upward, more than 60% (usually more than 70%) of the energy is typically used for the acceleration of the impulse generating elements. The inertia of the impulse generating elements is minimized by the present invention, whereby less energy is used for the acceleration of the impulse generating elements. The efficiency of the escapement system can hereby be considerably increased.

The efficiency of the escapement system results in a great approximation from the formula:

$$\eta=((M_H+M_L)/2-E_1/\Delta\alpha)/M_A \text{ where } M_A \geq M_H,$$

where $\eta$ is the efficiency, $M_L$ is the preload torque in the starting position or the low torque, $M_H$ is the torque in the tensioning position or the high torque, $E_1$ is the kinetic energy of the escapement parts moved during the impulse toward the impulse end, $\Delta\alpha$ is the angle of rotation of the escape wheel per impulse, and $M_A$ is the torque of the escape wheel. It is necessary for a correct routine that the drive axle of the escape wheel outputs a higher torque $M_A$ than is required to tension the impulse tooth. The efficiency of the escapement increases decisively due to the preload torque $M_L$ different from 0 Nm since more of the energy required for the tensioning ($\Delta\alpha \cdot M_A$) can be stored.

Minimal inertia and a preload torque $M_I$ of the impulse tooth or of the impulse teeth that is as high as possible in the starting position thus decisively contribute to the high efficiency of the escapement system in accordance with the invention, whereas a maximum of 50% of the available energy can be used without a preload in the starting position.

An escapement system having a constant impulse energy and a high efficiency can thus be achieved with the present invention.

A preferred embodiment of the present invention is characterized in that the escapement system has at least one resting element that has at least one tensioning surface that moves the impulse tooth from the starting position into a tensioning position on a rotation of the escape wheel. The balancing torque preferably has two tensioning surfaces.

It is particularly preferred that the impulse tooth can be pressed against the at least one tensioning surface by rotating the escape wheel with a torque that is greater than the preload torque of the at least one spring element in the starting position of the at least one impulse tooth such that it is moved out of the starting position into the tensioning position and the preload torque of the at least one spring element is increased in this process.

The at least one resting element is preferably configured as an anchor, as a resting lever, or as part of a balance.

It is further preferred that the at least one impulse tooth adopts a starting position in which it is fixed such that the spring element has a preload torque. This means that the at least one impulse tooth has a starting position in which it is fixed such that the spring element has a preload torque and adopts this starting position. It is here naturally still possible that the impulse tooth is moved out of the starting position into a different position, e.g. the tensioning position.

It is particularly preferred that the at least one impulse tooth or the impulse teeth has/have a (preload) torque >0 in every position it or they can adopt.

In accordance with a further preferred embodiment, the escape wheel has a plurality of impulse teeth. It is preferred here that each of the impulse teeth is connected to the drive axle via a spring element, respectively. It is alternatively also possible that one, several, or all of the impulse teeth are each connected to the drive axle via one or more spring elements. It is further preferred that each of the impulse teeth is configured in one piece with the respective spring element via which it is connected to the drive axle.

In a further preferred embodiment of the escapement system in accordance with the invention, the at least one escape wheel has at least one abutment that fixes the impulse tooth in its starting position. The at least one impulse tooth can, for example, be pressed against the abutment to thus be fixed in its preloaded starting position. The at least one escape wheel preferably has exactly as many abutments as impulse teeth. It is additionally preferred that the abutments are arranged on the resting wheel.

A further preferred embodiment of the escapement system in accordance with the invention is characterized in that the escapement system has one or more resting teeth. The resting teeth are preferably arranged on the escape wheel, preferably on the resting wheel.

In accordance with a further preferred embodiment of the escapement system in accordance with the invention, at least one escape wheel (or the at least one escape wheel) is designed in two parts and comprises as the first part an impulse wheel that has the at least one impulse tooth and as the second part a resting wheel, with the impulse wheel and the resting wheel being fixed in a fixed position with respect to one another and with the running off of the drive train at the resting wheel preferably being controllable or controlled. If the escapement system comprises a plurality of escape wheels, all the escape wheels or only some of the escape wheels can be designed in two parts, for example.

In an alternative preferred embodiment of the escapement system in accordance with the invention, at least one escape wheel (or the at least one escape wheel) is designed in one part and in two planes, with one of the two planes having the at least one impulse tooth and with the running off of the drive train at the resting wheel preferably being controllable or controlled. If the escapement system comprises a plurality of escape wheels, all the escape wheels or only some of the escape wheels can be designed in one part and in two planes.

It is further preferred that the escapement system in accordance with the invention has an efficiency of more than 30%, preferably of more than 35%.

The present invention additionally relates to a measuring device that comprises the escapement system in accordance with the invention.

In a preferred embodiment of the measuring device in accordance with the invention, the measuring device comprises a power regulator.

The measuring device in accordance with the invention is preferably a time measuring device, in particular a timepiece.

This principle can be used for the most varied escapement types:

Anchor Escapements:

The impulse is transmitted via an intermediate element from the escape wheel to the balance.

a.) An element is used that has an impulse surface and a tensioning surface and a resting surface.

Two elements are used, one has the impulse surface and the tensioning surface, a further one has the resting surface.

Chronometer Escapements:

The impulse is transmitted directly from the escape wheel to the balance that thus has the impulse surface.

a.) There is a resting lever that has the tensioning surface and the resting surface and is temporarily in contact with the balance.

b.) There is a tension lever that has the tensioning surface and is temporarily in contact with the balance; there is also a resting lever that is actuated by the balance or the impulse tooth.

Duplex escapements:

The impulse is transmitted directly from the escape wheel to the balance that thus has the impulse surface.

a.) The tensioning surface and the resting surface are likewise components of the balance.

b.) The tensioning surface and the resting surface are disposed on a separate element that is permanently in contact with the balance.

The tensioning surface is a component of the balance, the resting surface is disposed on a separate element that is permanently in contact with the balance.

The present invention will be explained in more detail with reference to the following examples and Figures without restricting it to the specific embodiments and parameters shown here.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

The function of the escapement system in accordance with the invention will be explained in the following with reference to the Figures by way of example in a "constant energy escapement" similar to the "Swiss anchor escapement".

Figure 1:
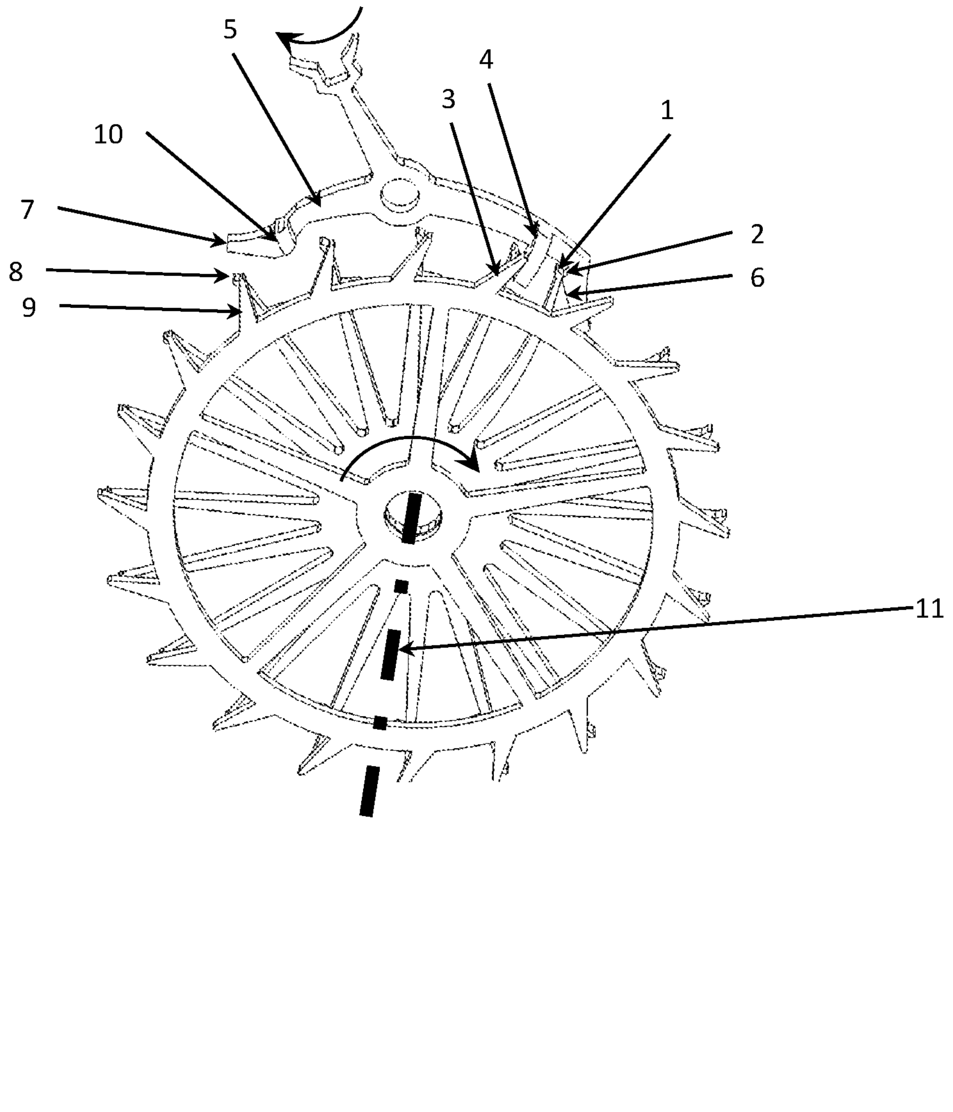
FIG. 1 illustrates an example of escapement system showing impulse teeth in different positions: one in a starting position with a preload torque and another in a tensioning position.

A special embodiment of the escapement system in accordance with the invention is first shown in FIG. 1. The escapement system here comprises a drive axle 11 and an escape wheel that has a plurality of impulse teeth 1, 8, with the impulse teeth 1, 8 being connected to the drive axle 11 via spring elements. Each of the impulse teeth 1, 8 is here respectively connected to the drive axle 11 via a spring element. It is alternatively also possible, however, that one, more, or all of the impulse teeth are connected to the drive axle via one or more spring elements. As shown in FIG. 1, the impulse teeth have a starting position that they can adopt, as can be seen by way of example at the impulse tooth 8. The impulse tooth is fixed in this starting position such that the spring element via which the resting tooth is connected to the drive axle has a preload torque. The impulse teeth can, however, also adopt a tensioning position such as can be seen by way of example at the impulse tooth 1.

Figure 2A:
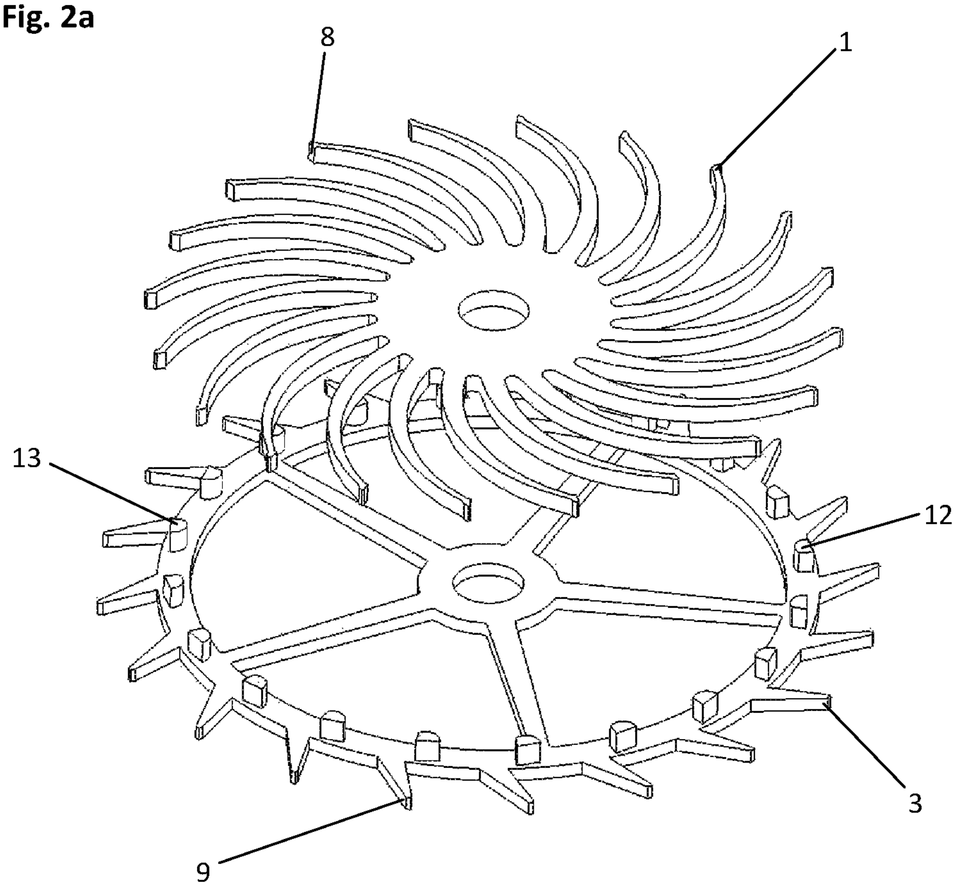
FIG. 2*a* illustrates example components of an escape wheel before assembly.
Figure 2B:
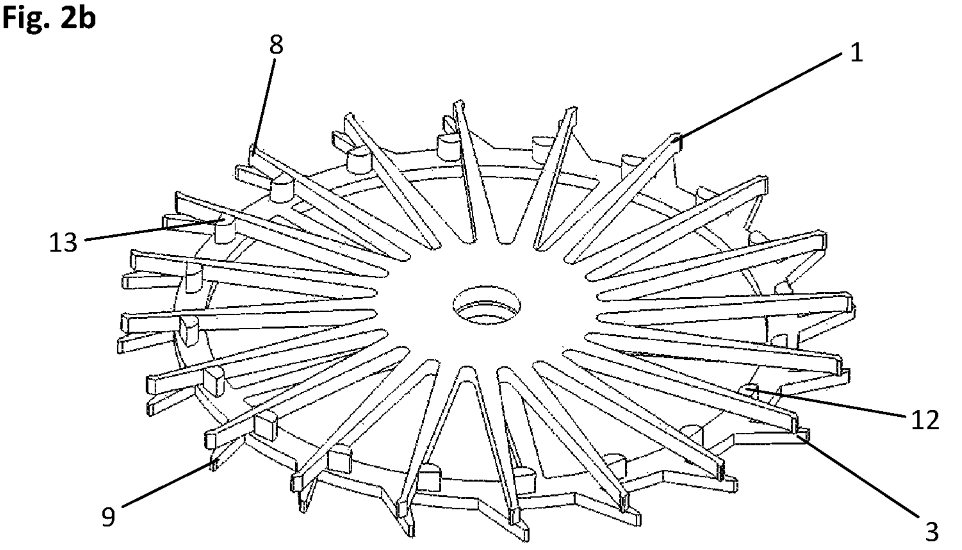
FIG. 2*b* illustrates an example of an assembled state of the impulse wheel and resting wheel, fixed in a position relative to each other.

The escape wheel shown in FIG. 1 is designed in two parts. It comprises as a first part an impulse wheel that has the impulse teeth 1, 8 and as a second part a resting wheel that has resting teeth 3, 9. Both parts are shown before the assembly of the escape wheel in FIG. 2*a*. The spring elements connected to the impulse teeth are here in a relaxed state. In FIG. 2*b* (as also in FIG. 1), the two parts are shown after the assembly and after a rotation of the hubs with respect to one another. The impulse wheel and the resting wheel are fixed to one another in a fixed position here. In addition, the impulse teeth are pressed against abutments 12, 13, located on the resting wheel so that the impulse teeth are fixed in the starting position in which they have a preload torque.

In addition, the escape wheel shown in FIG. 1 has a resting element 5, with the latter being designed as an anchor. The resting element 5 has two tensioning surfaces 2, 7 that move the impulse teeth 1, 8 from the starting position into the tensioning position on a rotation of the escape wheel. In this process, the respective impulse tooth 1 is pressed against the tensioning surface 2 by a rotation of the escape wheel with a torque that is greater than the preload torque of the spring element in the starting position of the impulse tooth 1 such that it is moved out of the starting position into the tensioning position and the preload torque of the spring element is increased in so doing as is shown in FIG. 1 for the example of the impulse tooth 1.

FIGS. 3*a* to 6*a* and 3*b* to 6*b* now show the function of the escapement system during the rotation of the escape wheel by the drive axle. Figures a and b of the same number here show the escapement system in each case at the same time from different perspectives, once from the front and once from the back.

Figure 3A:
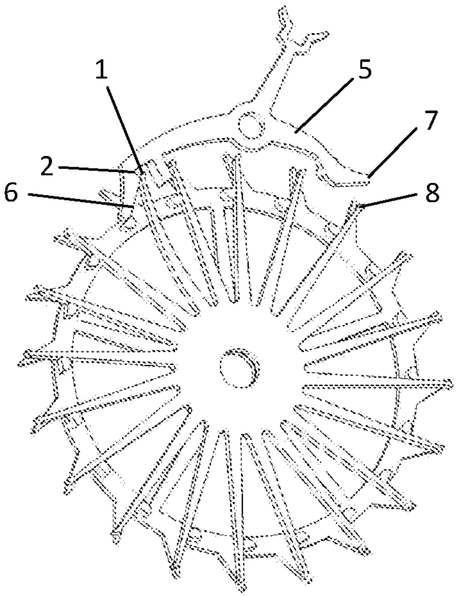
FIGS. 3*a* and 3*b* illustrate examples of the escapement system from different perspectives at the moment when an impulse tooth is tensioned by a tensioning surface.
Figure 3B:
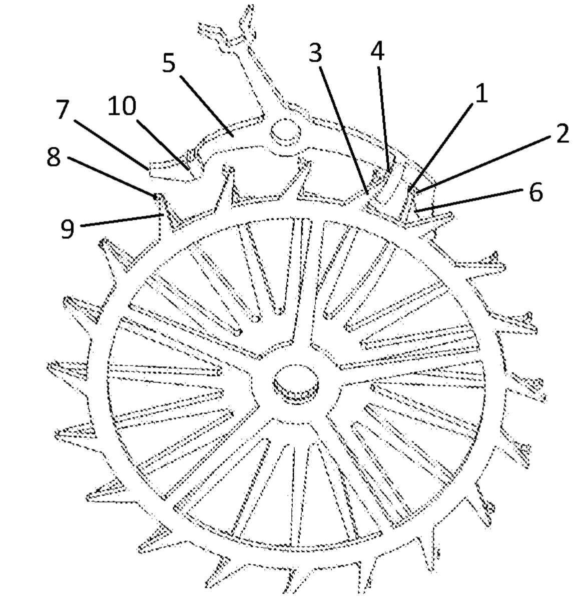

In FIGS. 3*a* and 3*b*, the impulse tooth 1 is tensioned by the tensioning surface 2 at the starting anchor side to a higher torque $M_H$. At the same time, the drive axle 11 of the escape wheel is arrested by the contact between the resting tooth 3 and the resting surface 4. The difference between the drive torque $M_A$ and the preload torque $M_H$ is supported via this.

Figure 4A:
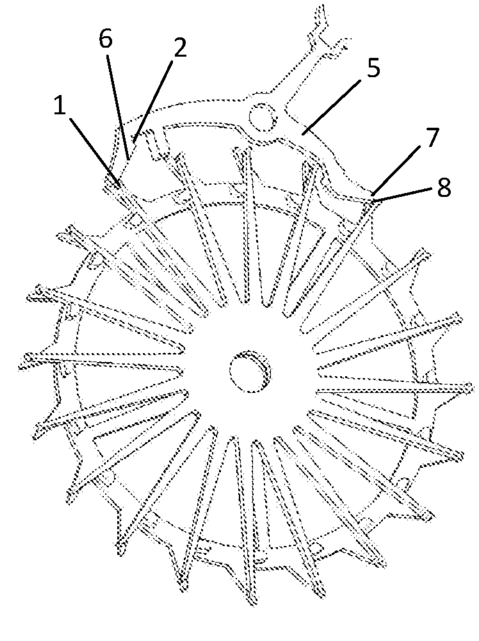
FIGS. 4*a* and 4*b* illustrate an example of a release and subsequent movement of an impulse tooth from the tensioning surface to impact a lifting surface.
Figure 4B:
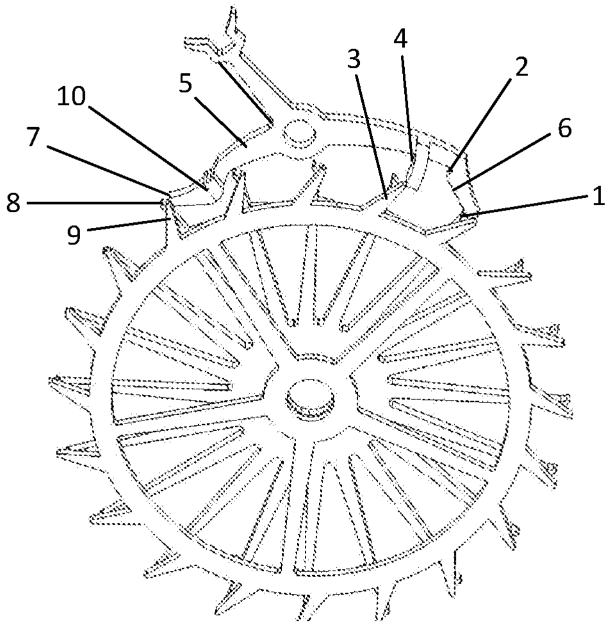

If now the balance moves the anchor 5, there is initially a release of the impulse tooth 1 as soon as it no longer rests on the tensioning surface 2. After release of the impulse tooth 1, it impacts the lifting surface 6 and drives the anchor 5 as is shown in FIGS. 4*a* and 4*b*. In this process, the impulse tooth 1 relaxes from its high preload level $M_H$ to its low level $M_L$. Toward the end or after the energy output, the tensioning surface 7 has been moved in front of the impulse tooth 8 by the anchor movement. The resting surface 4 now releases the escape wheel for the retensioning in that it releases the resting tooth 3.

Figure 5A:
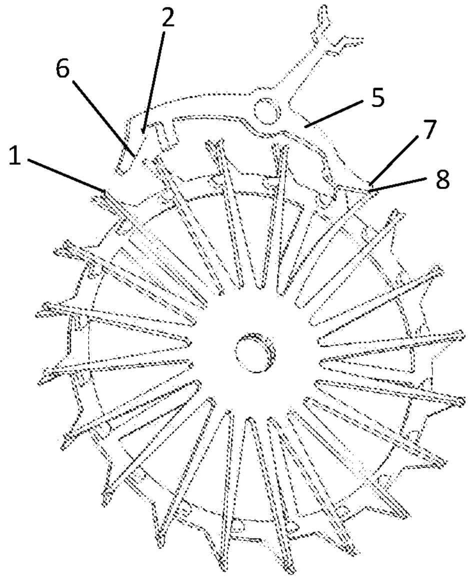
FIGS. 5*a* and 5*b* illustrate an example of the escapement cycle in which another impulse tooth is preloaded by a tensioning surface from a low torque level to a high torque level.
Figure 5B:
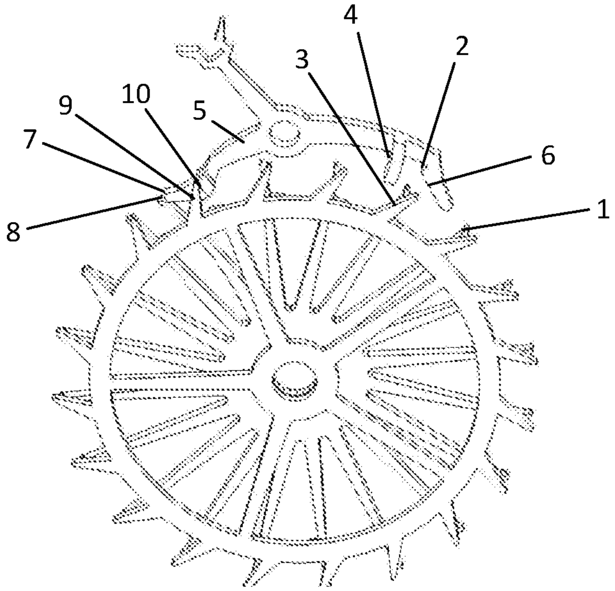

There is now—while the balance performs its complementary arc—a movement of the drive axle 11 until the resting tooth 9 is incident on the resting surface 10, as is shown in FIGS. 5*a* and 5*b*. During this process, the impulse tooth 8 is now preloaded by the tensioning surface 7 at the input side anchor side from the torque level $M_L$ to $M_H$.

Figure 6A:
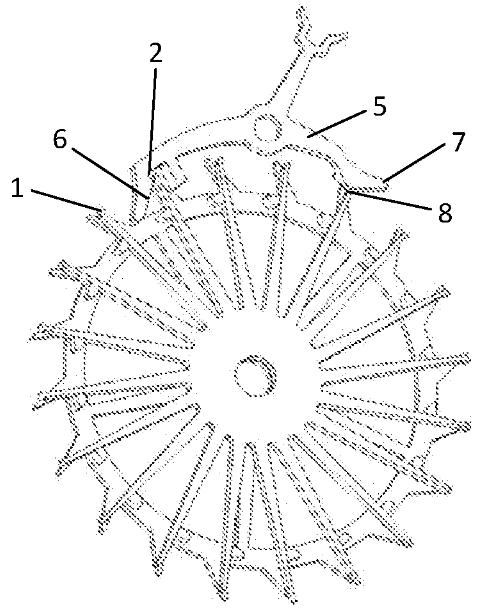
FIGS. 6*a* and 6*b* illustrate the release of a previously tensioned impulse tooth, impacting the lifting surface at the input side of the anchor, and the subsequent relaxation from a high preload level to a low level.
Figure 6B:
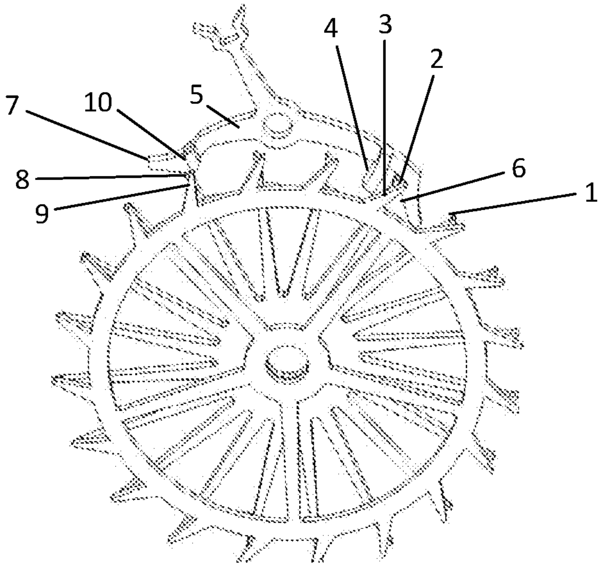

If now the balance again moves the anchor 5, there is a release of the impulse tooth 8 as soon as it no longer rests on the tensioning surface 7. After release of the impulse tooth 8, it impacts the lifting surface at the input side of the anchor and drives the anchor 5 as is shown in FIGS. 6*a* and 6*b*. In this process, the impulse tooth 8 relaxes from its high preload level $M_H$ to its low level $M_L$. The resting surface 10 now releases the resting tooth 9 of the resting wheel, which triggers the preloading of the next impulse tooth.

From here onward, the routines repeat as soon as the balance performs a further passage of the resting position.

Figure 7:
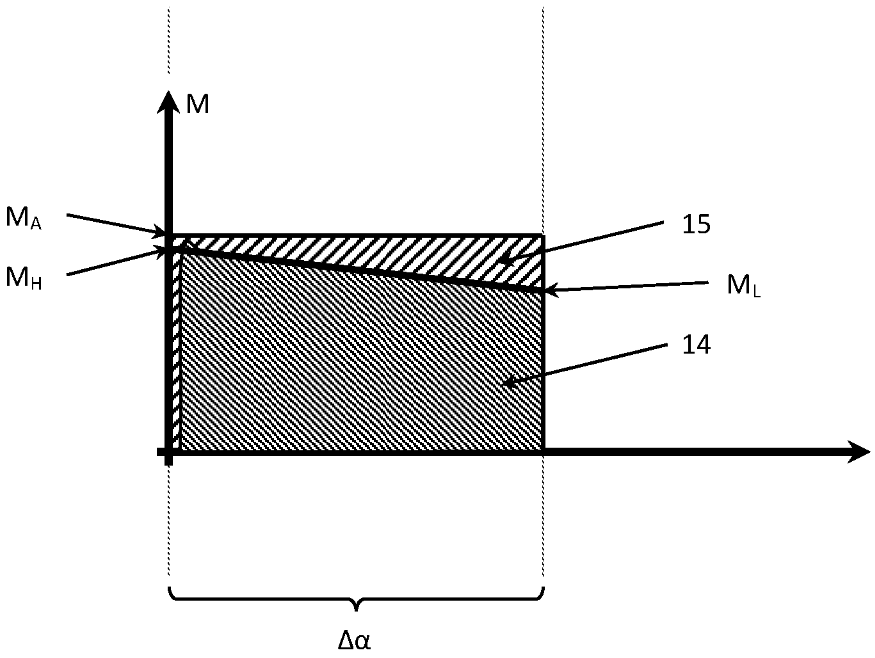
FIG. 7 illustrates an example of an energy diagram of the escapement system.

It is necessary for a correct routine that the drive axle 11 of the escape wheel outputs a higher torque $M_A$ than is required to tension the impulse tooth 1, 8. The efficiency of the escapement increases decisively due to a low preload torque ML different from 0 Nm since more of the energy required for the tensioning ($\Delta\alpha - M_A$) can be stored. This is also illustrated by FIG. 7 that shows the energy diagram of the escapement. It is shown there that due to the high preload level $M_L$ of the impulse teeth in the starting position, the amount of transmitted energy 14 is very high in comparison with the amount of lost energy 15. It can thus easily be seen from the diagram that a preload torque $M_L$ of the pulse teeth that is as high as possible in the starting position decisively contributes to the efficiency of the escapement system in accordance with the invention. Without a preload in the starting position, in contrast, a maximum of 50% of the available energy could be used.

The invention claimed is:

1. An escapement system comprising:

a drive axle; and at least one escape wheel that has multiple impulse teeth, wherein each tooth of the multiple impulse teeth is connected to the drive axle via at least one corresponding spring element, respectively, and has a starting position in which it is fixed such that the at least one corresponding spring element has a preload torque, wherein the starting position is a position in which at least one of the impulse tooth or the at least one corresponding spring element has a lowest tension in a cycle of the at least one escape wheel.

2. The escapement system in accordance with claim 1, further comprising:

at least one resting element that has at least one tensioning surface that moves the multiple impulse teeth from the starting position into a tensioning position on a rotation of the at least one escape wheel.

3. The escapement system in accordance with claim 2, wherein the multiple impulse teeth are e pressed against the at least one tensioning surface by rotating the at least one escape wheel such that they are moved out of the starting position into the tensioning position and the preload torque of the at least one corresponding spring element is increased in this process.

4. The escapement system in accordance with claim 2, wherein the at least one resting element is designed as at least one of: an anchor, a resting lever, or as part of a balance.

5. The escapement system in accordance with claim 1, wherein the at least one escape wheel has multiple abutments that fix the multiple impulse teeth in their starting position.

6. The escapement system in accordance with claim 1, wherein the escapement system has one or more resting teeth.

7. The escapement system in accordance with one claim 1, wherein the at least one escape wheel is designed in two parts, and comprises as a first part an impulse wheel that has the multiple impulse teeth and as a second part a resting wheel, with the impulse wheel and the resting wheel being fixed in a fixed position with respect to one another and with a running off of a drive train at the resting wheel being controllable.

8. The escapement system in accordance with claim 1, wherein the at least one escape wheel is designed in one part and in two planes, with one of the two planes having the multiple impulse teeth and with the running off of a drive train at a resting wheel being controllable.

9. A measuring device comprising an escapement system, the escapement system comprising:

a drive axle; and at least one escape wheel that has multiple impulse teeth, wherein each tooth of the multiple impulse teeth is connected to the drive axle via at least one corresponding spring element, respectively, and has a starting position in which it is fixed such that the at least one corresponding spring element has a preload torque, wherein the starting position is a position in which at least one of the impulse tooth or the at least one corresponding spring element has a lowest tension in a cycle of the at least one escape wheel.

10. The measuring device in accordance with claim 9, further comprising:

a power regulator.

11. The measuring device in accordance with claim 9, wherein the measuring device is a time measuring device.

12. The measuring device in accordance with claim 11, wherein the time measuring device is a timepiece.

13. An escapement system comprising:

a drive axle;

at least one escape wheel that includes multiple impulse teeth, wherein each tooth of the multiple impulse teeth is connected to the drive axle via at least one corresponding spring element, respectively, and has a starting position which is fixed such that the at least one corresponding spring element has a preload torque, and wherein the at least one escape wheel has multiple abutments that fix the multiple impulse teeth in their starting position;

a resting element that includes at least one tensioning surface, that moves the multiple impulse teeth from the starting position to a tensioning position on a rotation of the at least one escape wheel, wherein the multiple impulse teeth can be pressed against the at least one tensioning surface by rotating the at least one escape wheel such that the multiple impulse teeth are moved out of the starting position into the tensioning position and the preload torque of the at least one corresponding spring element is increased by the rotation of the at least one escape wheel, and wherein the resting element is at least one of: an anchor a balance lever, or a part of a balance; and at least one balance tooth.

* * * * *